US006999622B2

(12) United States Patent
Komatsu

(10) Patent No.: US 6,999,622 B2
(45) Date of Patent: Feb. 14, 2006

(54) STROKE DATA EDITING DEVICE

(75) Inventor: Yoshiaki Komatsu, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 687 days.

(21) Appl. No.: 09/816,385

(22) Filed: Mar. 26, 2001

(65) Prior Publication Data

US 2001/0036318 A1    Nov. 1, 2001

(30) Foreign Application Priority Data

Mar. 31, 2000    (JP)    ............................... 2000-099357

(51) Int. Cl.
G06K 9/00    (2006.01)
G06K 9/46    (2006.01)
G06K 9/03    (2006.01)
G09G 1/10    (2006.01)
G09G 5/00    (2006.01)

(52) U.S. Cl. ...................... 382/202; 382/309; 382/188; 345/17; 345/179

(58) Field of Classification Search ................ 382/202, 382/309, 186–189; 345/16–17, 178, 173, 345/179, 174, 156; 178/18.01, 19.01
See application file for complete search history.

(56) References Cited

U.S. PATENT DOCUMENTS

| | | | | |
|---|---|---|---|---|
| 4,241,340 A | * | 12/1980 | Raney, Jr. .................... | 345/472 |
| 5,136,125 A | | 8/1992 | Russell ......................... | 178/19 |
| 5,511,135 A | * | 4/1996 | Rhyne et al. ................ | 382/187 |
| 5,698,822 A | * | 12/1997 | Haneda et al. ............ | 178/18.01 |
| 5,796,866 A | | 8/1998 | Sakurai et al. .............. | 382/187 |
| 5,930,380 A | * | 7/1999 | Kashi et al. ................ | 382/119 |
| 5,991,441 A | * | 11/1999 | Jourjine ...................... | 382/187 |
| 6,055,332 A | * | 4/2000 | Aitani et al. ................ | 382/186 |
| 6,151,611 A | * | 11/2000 | Siegel ......................... | 715/541 |
| 6,307,955 B1 | * | 10/2001 | Zank et al. ................. | 382/121 |
| 6,373,473 B1 | * | 4/2002 | Sakaguchi et al. ........... | 345/173 |

OTHER PUBLICATIONS

U.S. Appl. No. 09/628,724, filed Jul. 28, 2000, Nagai et al.
U.S. Appl. No. 09/634,322, filed Aug. 7, 2000, Nagai et al.
U.S. Appl. No. 09/636,818, filed Aug. 10, 2000, Okamoto et al.
U.S. Appl. No. 09/659,754, filed Sep. 11, 2000, Tomomatsu.
U.S. Appl. No. 09/666,892, filed Sep. 20, 2000, Wakayama et al.

* cited by examiner

*Primary Examiner*—Joseph Mancuso
*Assistant Examiner*—Shefali Patel
(74) *Attorney, Agent, or Firm*—Oliff & Berridge PLC

(57) ABSTRACT

A stroke data editing device, for editing stroke data, indicating at least one stroke of a coordinate input device, comprising, a stroke data storage unit that stores stroke data, each piece of the stroke data corresponding to one stroke of a coordinate input device, a stroke data retrieving unit that retrieves, according to a predetermined condition, at least one piece of the stroke data from the stroke data storage unit so that the retrieved stroke data corresponds to at least one stroke included in a predetermined area, and a stroke data editing unit that edits at least one piece of the stroke data retrieved by the stroke retrieving unit on a stroke basis.

17 Claims, 18 Drawing Sheets

Fig. 3A

| STORAGE TIME DATA | t |
|---|---|
| ID DATA | 001 |
| COLOR DATA | c |
| WIDTH DATA | w |
| POSITIONAL DATA 0 | (x0, y0) |
| POSITIONAL DATA 1 | (x1, y1) |
| | ⋮ |

Fig. 3B

| STROKE DATA 0 |
|---|
| STROKE DATA 1 |
| STROKE DATA 2 |
| ⋮ |
| STROKE DATA 6 (ERASING STROKE DATA) |
| STROKE DATA 7 |
| ⋮ |

Fig.10 A
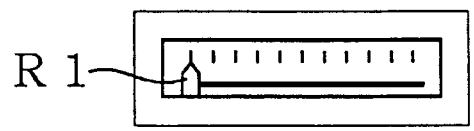
Fig.10 B
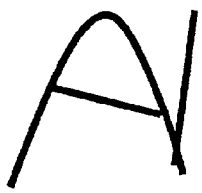
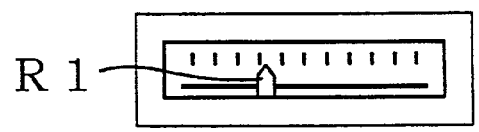
Fig.10 C
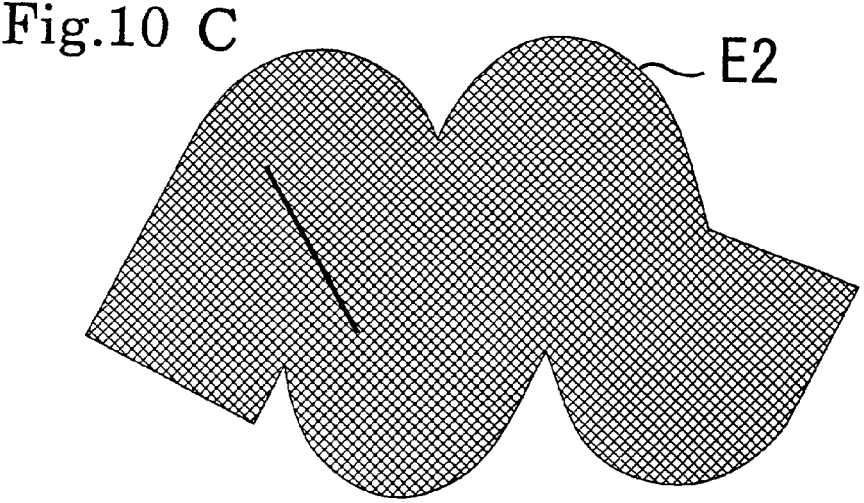
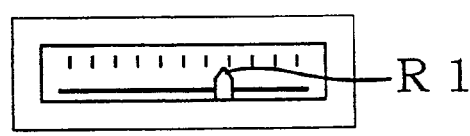

Fig.10 D
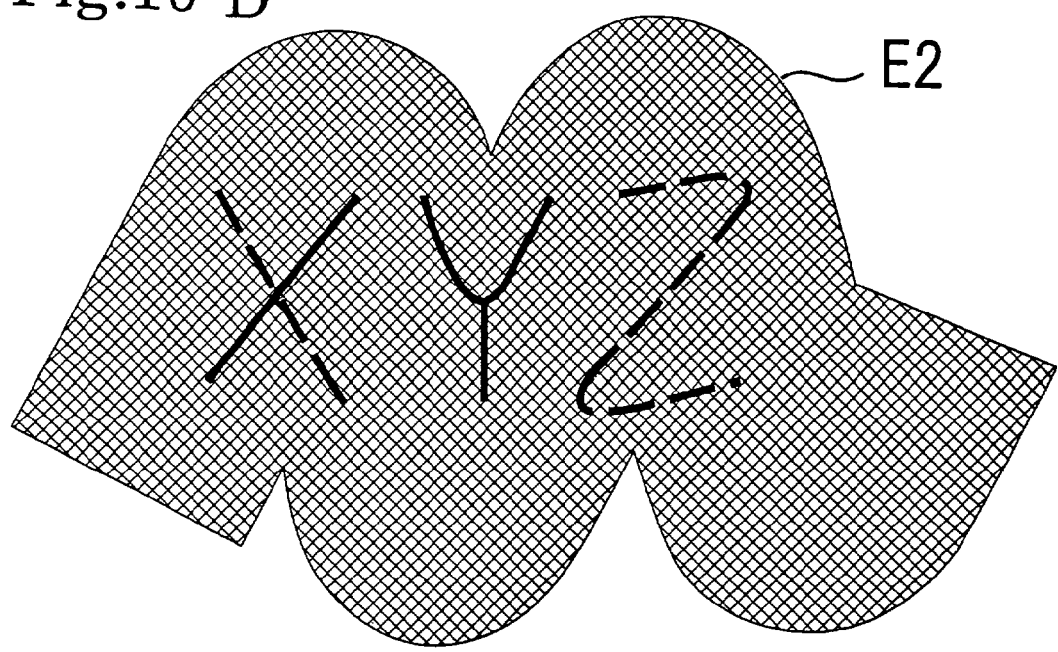
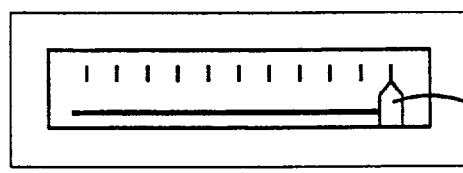

STROKE DATA EDITING DEVICE

BACKGROUND OF THE INVENTION

1. Field of Invention

The invention relates to a stroke data editing device for editing stroke data indicative of one or more strokes of a coordinate input device on an input plane provided in a coordinate reader. The invention also relates to a method for editing the stroke data and to a computer-readable memory medium that stores a stroke data editing program for editing the stroke data.

2. Description of Related Art

Stroke data editing systems comprising stroke data generating devices (such as tablets) and stroke data editing devices are known. The stroke data generating systems ordinarily comprise coordinate input devices for inputting coordinates thereof, coordinate readers for reading the input coordinates of the coordinate input devices, stroke data generators for generating, based on the read coordinates, the stroke data indicating strokes of the coordinate input devices, and stroke data editing devices for editing the stroke data.

The strokes, defined by the coordinates of the coordinate input devices, indicate characters, numerals and/or figures, which may constitute a word and/or a line. The conventional stroke data editing devices manage and edit the stroke data on such a block basis (namely, a character, a word, a line or a figure basis).

For example, U.S. Pat. No. 5,796,866 discloses a stroke data editing system that comprises a tablet and a group management unit for managing group data representative of a plurality of strokes within one group. Each group includes at least one of a character group indicating a handwritten character, a word group indicating a handwritten word, a line group consisting of a plurality of handwritten characters and/or words, and a figure group indicating a handwritten figure.

The stroke data editing devices ordinarily comprise displays that display the strokes based on the stroke data thereon. The conventional stroke data editing devices retrieve and edit the stroke data, when the corresponding strokes are designated by an editing area on the displays.

However, if the editing area includes strokes to be edited (referred to as target strokes) and strokes not to be edited (referred to as non-target strokes), the stroke data editing devices retrieve the stroke data corresponding to both the target strokes and the non-target strokes, regardless of the operators' intentions. (Herein, the stroke data to be edited is referred to as target stroke data, while the stroke data not to be edited is referred to as non-target stroke data.) In other words, the conventional stroke data editing devices can not retrieve the target stroke data while not retrieving the non-target stroke data. The conventional stroke data editing devices result in both the target and the non-target stroke data being edited.

For example, it is assumed that an editing area is set including a black-colored character train and a red-colored character train. Even if it is intended to edit only the stroke data of the black-colored character train, the conventional stroke data editing devices retrieve the stroke data, not only of the black-colored character train, but of the red-colored character train.

It is assumed, as another example, that an editing area is set including character trains handwritten by two people. Even if it is intended to edit only the stroke data of the character train written by one person, the conventional stroke data editing devices will also retrieve the stroke data of the character train written by another person.

It is further assumed that character trains "ABC" and "DEF" are written in two lines: "ABC" in an upper line and "DEF" in a lower line, as shown in FIG. 14. In FIG. 14, an editing area T4 is set including the character trains "ABC" and one stroke of the character "E". Thus, even if it is intended to edit only the stroke data of the character train "ABC", the stroke data editing devices retrieve, not only the stroke data of the character train "ABC", but also the stroke data of the one stroke of the character "E" simultaneously, and can not withdraw the stroke data of the one stroke of the character "E" from editing.

Moreover, the stroke data editing devices store the stroke data in a memory so as to play back the stroke data on the displays at any time, even if the corresponding strokes are erased from the input planes. For example, the strokes written by pens are erased by using erasers, but the stroke data of the erased strokes is stored in the memory. For that purpose, when erasing the strokes of the pens by using the erasers, the stroke data editing devices recognize tracks of the erasers as new strokes, and then, input and store new stroke data indicating the strokes of the erasers. (Herein, the stroke data of the pen is referred to as writing stroke data, while the stroke data of the eraser is referred to as erasing stroke data. Also, the stroke of the pen is referred to as writing stroke, while the stroke of the eraser is referred to as erasing stroke.) The erasing stroke data is input in a background color of the input plane. Both of the writing stroke data and the erasing stroke data on the displays are reproduced at one time, whereby the writing strokes of the pens appear to be erased by being masked by the erasing strokes of the erasers. If new strokes are written by the pens over the erasing strokes, the stroke data editing devices input and store the corresponding new writing stroke data.

However, in that case, the conventional stroke data editing devices retrieve not only the new writing stroke data but also the precedent writing stroke data simultaneously, if the editing area is set to edit the new stroke data. In addition, the conventional stroke data editing devices also retrieves the erasing stroke data.

By way of example, it is assumed that a character train "ABC" is first written on the input plane as shown in FIG. 13A and then erased by wiping the input plane along an erasing stroke E3 tracked by the eraser as shown in FIG. 13B. It is further assumed that another character train "XYZ" is written over the erasing stroke E3 as shown in FIG. 13C. If an editing area T3 is set as shown in FIG. 13D to edit the character train "XYZ", the conventional stroke data editing devices retrieve not only the writing stroke data of the character train "XYZ" but the writing stroke data of the character train "ABC" and the erasing stroke data of the erasing stroke E3, as shown in FIG. 13E. It is noted that, in FIG. 13E, the writing strokes of the character train "ABC" are shown for convenience for explanation, but are actually masked by the erasing stroke E3.

As described above, the conventional stroke data editing devices can not select and retrieve only the target writing stroke data. Therefore, the conventional stroke data editing devices edits both the target and non-target writing stroke data and the erasing stroke data.

SUMMARY OF THE INVENTION

In the view of the foregoing, the invention has been developed to resolve the above-mentioned and other problems.

According to one exemplary aspect of the invention, there is provided a stroke data editing device, for editing stroke data, indicating at least one stroke of a coordinate input device, comprising, a stroke data storage unit that stores stroke data, each piece of the stroke data corresponding to one stroke of a coordinate input device, a stroke data retrieving unit that retrieves, according to a predetermined condition, at least one piece of the stroke data from the stroke data storage unit so that the retrieved stroke data corresponds to at least one stroke included in a predetermined area, and a stroke data editing unit that edits at least one piece of the stroke data retrieved by the stroke retrieving unit on a stroke basis.

According to another exemplary aspect of the invention, there is provided a stroke data editing device, for editing stroke data, indicating at least one stroke of an coordinate input device, comprising, storing means for storing stroke data therein, each piece of the stroke data corresponding to one stroke of the coordinate input device, retrieving means for retrieving at least one piece of the stored stroke data from the storing means according to a predetermined condition, the retrieved stroke data corresponding to at least one stroke included in a predetermined area, and editing means for editing at least one piece of the retrieved stroke data on a stroke basis.

According to still another exemplary aspect of the invention, there is provided a method, for editing stroke data, indicating at least one stroke of an coordinate input device, comprising, storing stroke data in a memory, each piece of the stroke data corresponding to one stroke of the coordinate input device, retrieving at least one piece of the stored stroke data from the memory according to a predetermined condition, the retrieved stroke data corresponding to at least one stroke included in a predetermined area, and editing at least one piece of the retrieved stroke data on a stroke basis.

According to yet another exemplary aspect of the invention, there is provided a computer-readable memory that stores a stroke data editing program, for editing stroke data, indicating at least one stroke of a coordinate input device, the stroke data editing program comprising, a program for storing stroke data in a memory, each piece of the stroke data corresponding to one stroke of the coordinate input device, a program for retrieving at least one piece of the stroke data from the memory according to a predetermined condition, the retrieved stroke data corresponding to at least one stroke included in a predetermined area, and a program for editing at least one piece of the retrieved stroke data on a stroke basis.

BRIEF DESCRIPTION OF THE DRAWINGS

The above and other objects, features and advantages of the invention will become more apparent from the following description of exemplary embodiments taken in connection with the accompanying drawings in which:

FIG. 3A schematically shows a data structure of stroke data;

FIG. 3B schematically shows a storage status of a RAM storing the stroke data;

FIG. 10A schematically shows a slide lever displayed on a monitor of the stroke data editing device according to the third exemplary embodiment of the invention;

FIGS. 10B to 10D schematically show how the editing processes proceed according to the third exemplary embodiment of the invention;

DETAILED DESCRIPTION OF PREFERRED EMBODIMENTS

An explanation will be given of a stroke data editing device, a method for editing stroke data and a computer-readable memory medium storing a stroke data editing program according to the invention based on the following exemplary embodiments. Herein, the exemplary embodiments refer to a stroke data editing device 100.

Figure 1:
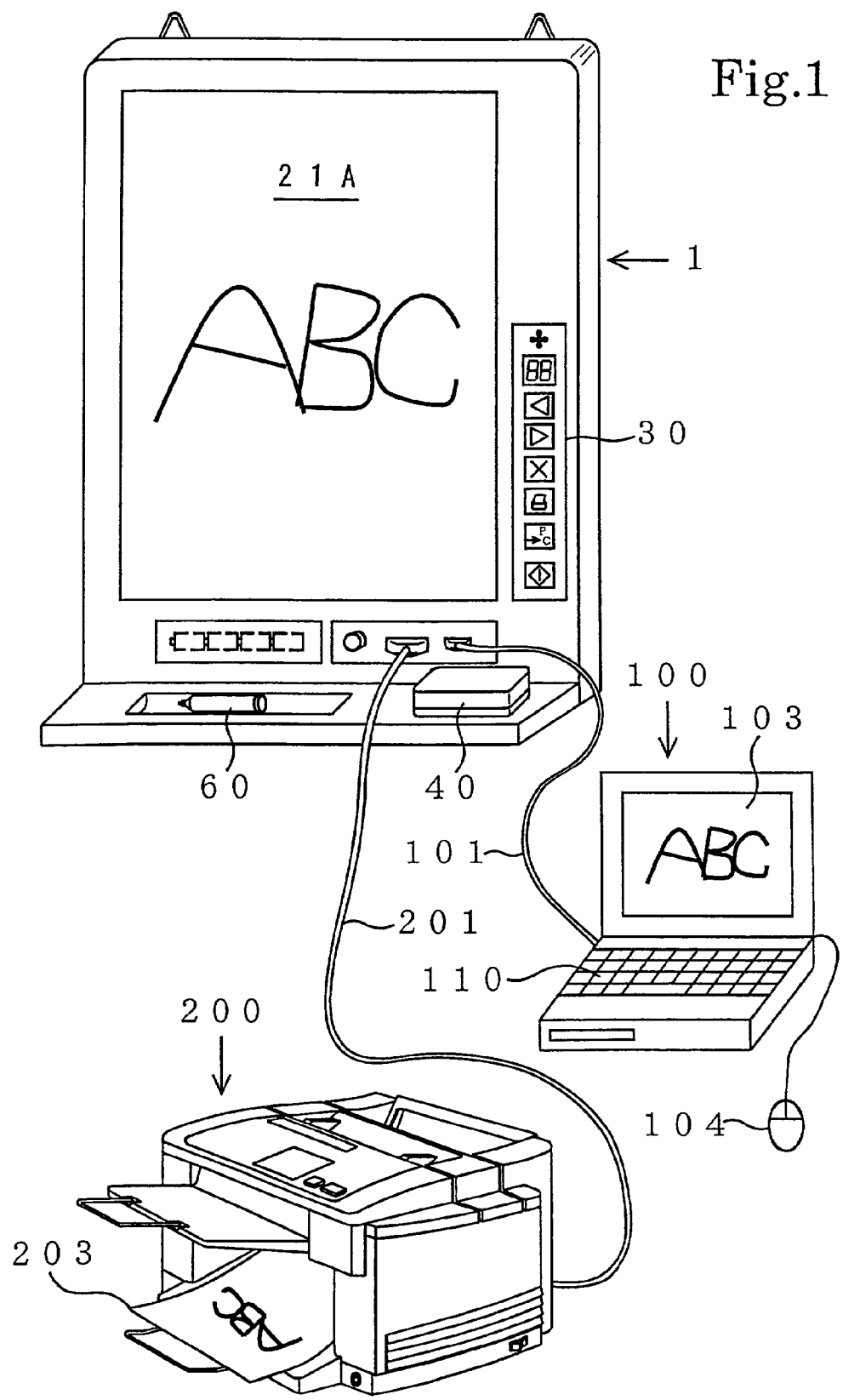
FIG. 1 is a perspective view of a stroke data editing system comprising an electric whiteboard for writing strokes and generating corresponding stroke data, a stroke data editing device for editing the stroke data, and a printer for printing the written strokes, according to one exemplary embodiment of the invention.

FIG. 1 is a perspective view of a stroke data editing system. The stroke data editing system comprises an electric whiteboard 1, a stroke data editing device 100 and a printer 200. The electric whiteboard 1 is electrically connected to the stroke data editing device 100 and the printer 200 with cables 101 and 201, respectively.

The electric whiteboard 1 comprises an input plane 21A, a pen 60, an eraser 40, and an operating portion 30. The pen 60 is for writing one or more writing strokes, such as characters and figures, on the input plane 21A and inputting writing stroke data indicative of the writing strokes of the pen 60 into the electric whiteboard 1. The eraser 40 is for erasing the writing strokes by overwriting a erasing stroke and inputting erasing stroke data indicative of the erasing stroke tracked by the eraser 40 into the electric whiteboard 1. (Herein, the writing stroke and the erasing stroke are generically called stroke. Similarly, the writing stroke data and the erasing stroke data are generically called stroke data.) The operating portion 30 has, for example, a speaker, a LED page display, a page back button, a page feed button, a delete button, a print button, a data transmission button, a power button and a LED battery display (not designated by the reference numerals in the figure). The speaker reproduces various sounds (such as a warping beep and an operating sound). The LED page display indicates, with 7 segments, a number of pages where the stroke data on the input plane 21A are stored in the electric whiteboard 1. The page back button and the page feed button are for paging up and down by a page at the push thereof, respectively. The delete button is for erasing one page's worth of the stroke data at the push thereof. The print button and the data transmission button are for outputting the stroke data to the printer 200 and to the stroke data editing device 100, respectively, at the push thereof. The power button is for energizing and de-energizing the electric whiteboard 1. The LED battery display indicates battery exhaustion of the pen 60.

The electric whiteboard 1 further comprises a plurality of loop coils (not shown in the figure) arranged beneath the input plane 21A.

The pen 60 comprises a coil therein, and oscillates an alternate magnetic field by using the coil when writing the stroke on the input plane 21A. The alternate magnetic field forms magnetic coupling with at least one of the loop coils, whereby positional signals are generated. The electric whiteboard 1 detects and samples the positional signals at established time intervals, determines coordinate positions of the pen 60 on the input plane 21A based on the detected positional signals, and generates positional data. The pen 60 further superimposes type data indicating, for example, an ink color (a stroke color), a pen tip size (a stroke width) and each individual pen ID on the alternate magnetic field. Accordingly, the electric whiteboard 1 electrically reads the positional data with the type data of the pen 60, and outputs the writing stroke data into the stroke data editing device 100.

The eraser 40 also comprises a coil therein, and oscillates an alternate magnetic field, while erasing the writing stroke from the input plane 21A. The alternate magnetic field forms magnetic coupling with at least one of the loop coils, whereby positional signals are generated. The electric whiteboard 1 detects and samples the positional signals at established time intervals, determines coordinate positions of the eraser 40 as a stroke based on the detected positional signals, and generates positional data. The eraser 40 superimposes type data indicating a stroke color, a stroke width and an eraser ID on the alternate magnetic field. The stroke color of the eraser 40 is a background color of the input plane 21A, so that the writing stroke appears to be deleted by being masked by the erasing stroke when reproducing the writing stroke data and the erasing stroke data at one time. The electric whiteboard 1 reads the positional data, with the type data of the eraser 40, and outputs the erasing stroke data into the stroke data editing device 100.

The above-mentioned structure of the electric whiteboard 1, the pen 60 and the eraser 40, and the data processing procedures (namely, how the positional data is generated and read, and how the type data is transmitted and read) are disclosed in more detail in U.S. patent application Ser. Nos. 09/636,818, 09/666,892, 09/659,754, 09/628,724 and 09/634,322, and U.S. Pat. No. 5,136,125, herein incorporated by reference.

The printer 200 receives the stroke data and prints the strokes written on the input plane 21A on a print sheet 203, when the print button is pushed.

Figure 2:
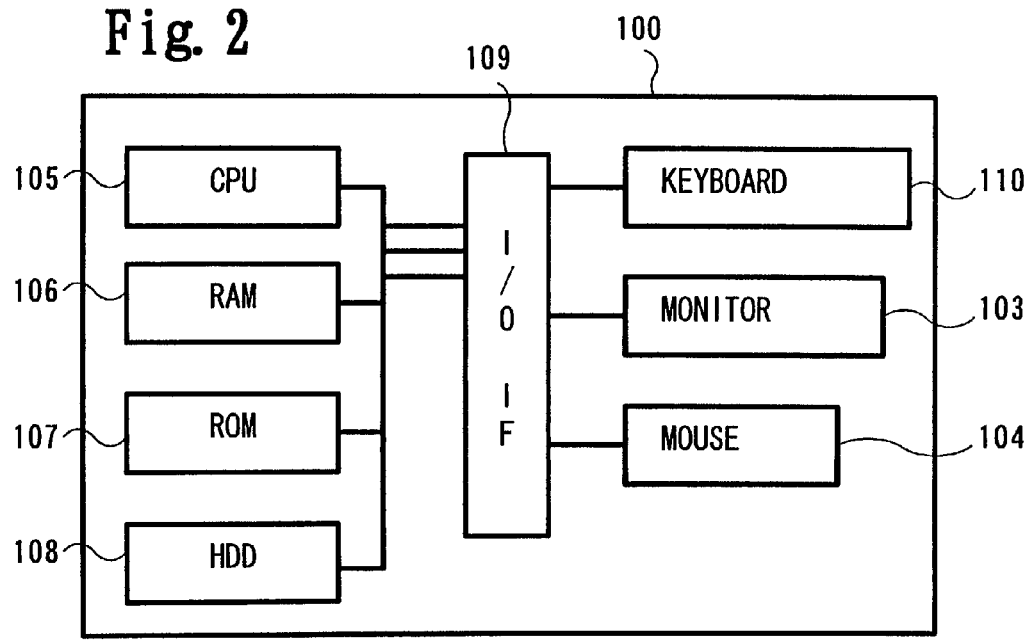
FIG. 2 is a block diagram of the stroke data editing device according to an embodiment of the invention.

FIG. 2 is a block diagram of the stroke data editing device 100. The stroke data editing device 100 comprises therein a CPU 105, a RAM 106, a ROM 107, a HDD 108, and an I/O interface 109. The CPU 105 is for processing the stroke data. The ROM 107 stores various control programs for controlling the CPU 105. The HDD 108 stores an operation system for executing the control programs. The RAM 106 temporarily stores the control programs, to be executed, read out of the ROM 107. The RAM 106 also stores the stroke data input, from the electric whiteboard 1, processed by the CPU 105.

FIG. 3A schematically shows a data structure of the stroke data, and FIG. 3B schematically shows a storage status of a RAM 106 storing the stroke data. Each piece of the writing stroke data corresponds to one writing stroke, while each piece of the erasing stroke data corresponds to one erasing stroke. The stroke data is stored in a storage area of the RAM 106 on a stroke basis in chronological order, as shown in FIG. 3B. The stroke data includes, as shown in FIG. 3A, storage time data T indicating time of storing the stroke data in the RAM 106, the type data, and the positional data indicating coordinate positions P0, P1, . . . of the pen 60 or the eraser 40. The type data includes ID data, color data C indicating a stroke color and width data W indicating a stroke width. The ID data of the writing stroke data indicates, for example, a pen number. The ID data of the erasing stroke data does not necessarily indicate an eraser number, but may identify the eraser in itself.

The stroke data editing device 100 further comprises a monitor 103 for displaying the stroke data input from the electric whiteboard 1 and/or processed by the CPU 105, and a mouse 104 and a keyboard 110 for inputting commands to process the stroke data. The monitor 103, the mouse 104 and the keyboard 110 are electrically connected to the I/O interface 109.

Figure 4:
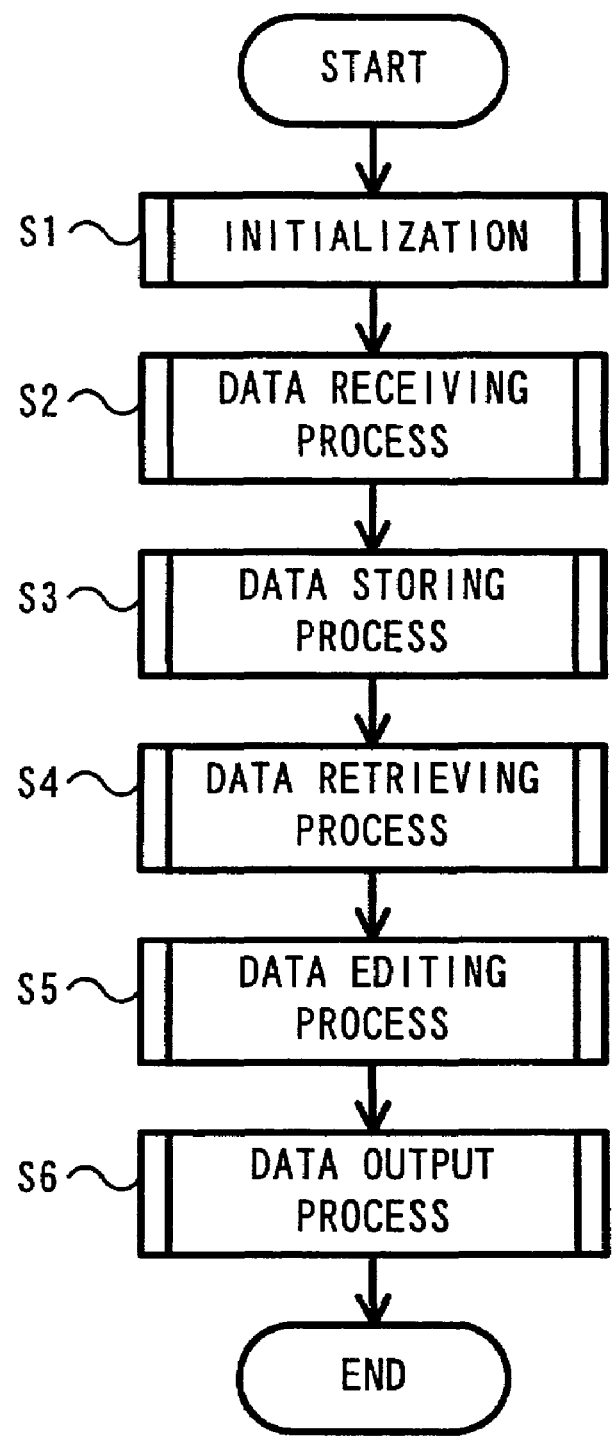
FIG. 4 is a flowchart for processing the stroke data according to an exemplary embodiment of the invention.

The procedure for processing the stroke data will be explained with reference to FIG. 4. FIG. 4 is a flowchart for processing the stroke data.

In step S1, the CPU 105 performs initialization by, for example, deleting memory contents in the RAM 106. The CPU 105 receives the stroke data therein in step S2, and stores the stroke data in the RAM 106 in step S3. The stroke data may be stored in the HDD 108. In step S4, the CPU 105 retrieves the stroke data from the RAM 106. The retrieved stroke data is displayed on the monitor 103. In step S5, the CPU 105 edits the stroke data according to the user's operation of the mouse 104 and/or the keyboard 110. The edited stroke data is also displayed on the monitor 103, whereby the user can confirm the editing. The CPU 106 outputs the stroke data to another stroke data editing device or an external storage device in step S6, if necessary.

Figure 5:
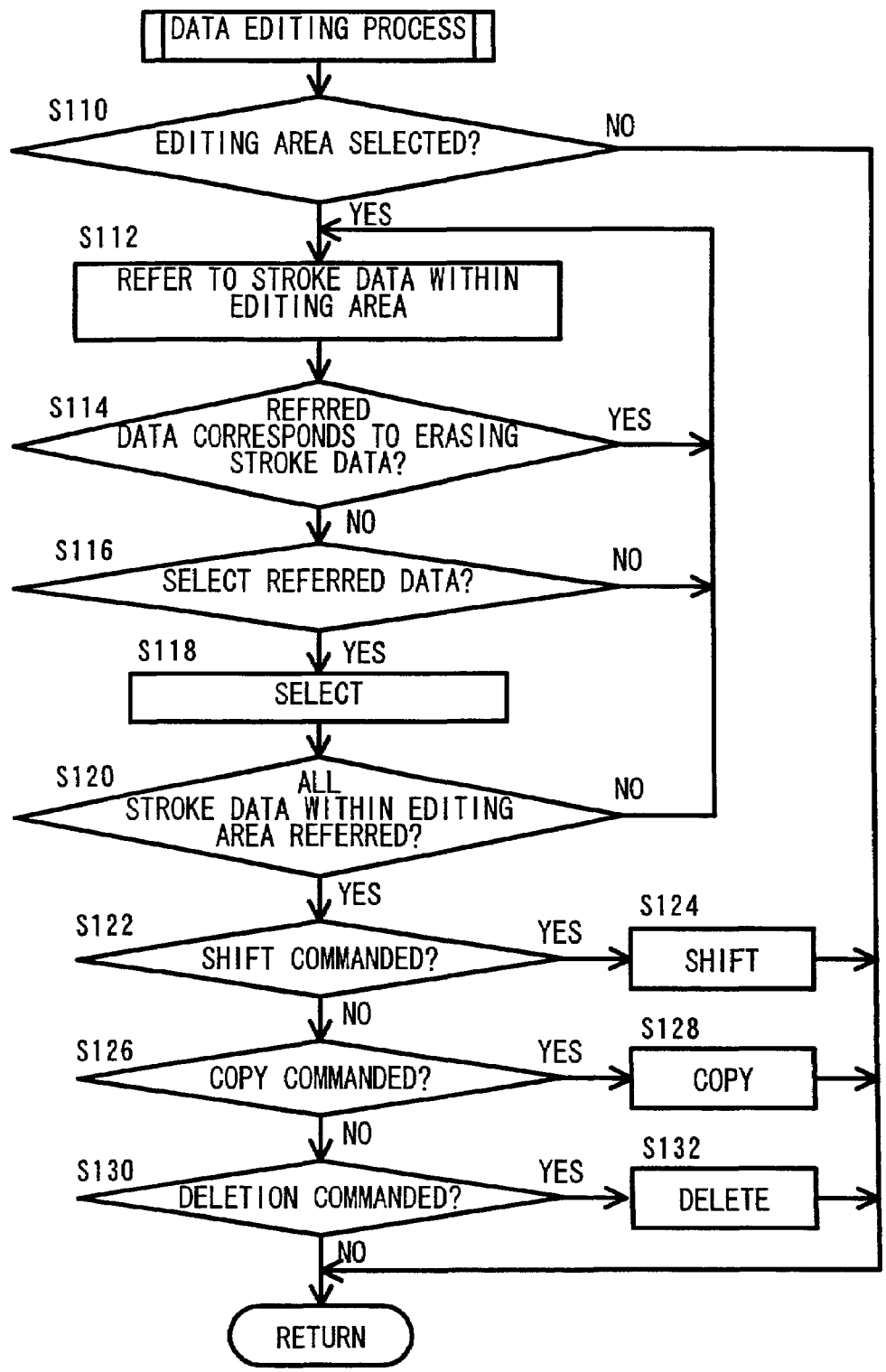
FIG. 5 is a flowchart for editing the stroke data according to a first exemplary embodiment of the invention.

The stroke data editing process of step S5 will be explained in greater detail according to a first exemplary embodiment of the invention. FIG. 5 is a flowchart for editing the stroke data according to the first exemplary embodiment.

In step S110, the CPU 105 judges whether an editing area is set including one or more target strokes of which the stroke data is to be edited. The set editing area may include one or more non-target strokes of which the stroke data will not be edited. The editing area can be designated by an operator so that the editing area includes the target strokes on the monitor 103, for example, by operating the mouse 104 on the monitor 103. Further, the editing area may be set as an area where any stroke is locatable. If Yes in step S110, the CPU 105 successively refers to the stroke data stored in the RAM 106 that corresponds to the strokes located within the set editing area in step S112. The stroke data is referred, for example, in reverse chronological order based on the storage time data.

In step S114, the CPU 105 determines whether the referred stroke data is erasing stroke data, based on the ID data (the pen ID data and the eraser ID data). If No in step S114, the CPU 105 retrieves the referred stroke data, and the stroke corresponding to the retrieved stroke data is displayed on the monitor 103. If Yes in step S114, the CPU 105 returns to step S112, and refers to other stroke data.

The CPU 105 judges whether an instruction has been given to select the displayed stroke as the target stroke in step S116. For example, the selection instruction can be given by the user, by visually checking the stroke displayed on the monitor 103. If Yes in step 116, the CPU 105 selects the stroke data in step S118. If No in step 118, the CPU 105 returns to step S112, and refers to other stroke data.

The CPU 105 repeats the steps S112 to S118 until judging, in step S120, that all the stroke data within the editing area has been referred. Only the target writing stroke data can be selected through steps S112 to S120.

After the target stroke data is specified, instructions to edit the whole or some of the selected target stroke data can be given by the user, for example, by operating the mouse 104 and/or the keyboard 110.

Then, in step S122, the CPU 105 judges whether an instruction has been given to shift the whole or some of the target strokes in the editing area. If Yes in step S122, the CPU 105 edits the target stroke data to make a shift on the strokes according to the given instruction in step S124.

If No in step S122, the CPU 105 judges, in step S126, whether another instruction has been given to copy the whole or some of the target strokes included in the editing area. If Yes in step S126, the CPU 105 edits the target stroke data to make a copy on the strokes according to the given instruction in step S28.

If No in step S126, the CPU 105 judges, in step S130, whether still another instruction has been given to delete the whole or some of the target strokes in the editing area. If Yes in step S30, the CPU 105 edits the target stroke data to make a deletion of the strokes according to the given instruction in step S32.

The order of performing shifting, copying and deleting is not limited as described in this exemplary embodiment. The shifting, copying and deleting can be performed in a different order, or may be repeated more than one time. A combination of the shifting, copying and deleting may be performed. Further, the CPU 105 may further have other functions of, for example, scaling, rotating and coloring the strokes.

Figure 6:
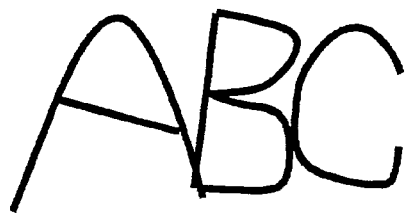
FIGS. 6A to 6F schematically show how the editing processes proceed according to the first exemplary embodiment of the invention
Figure 6:
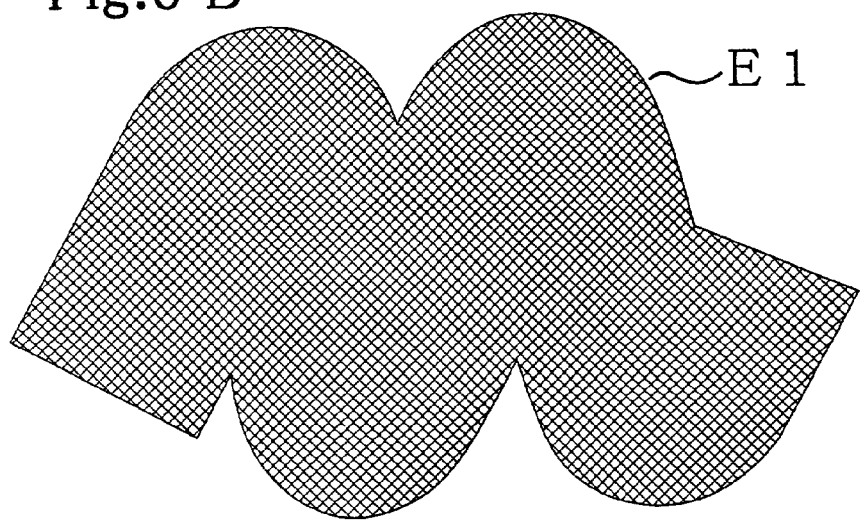
Figure 6:
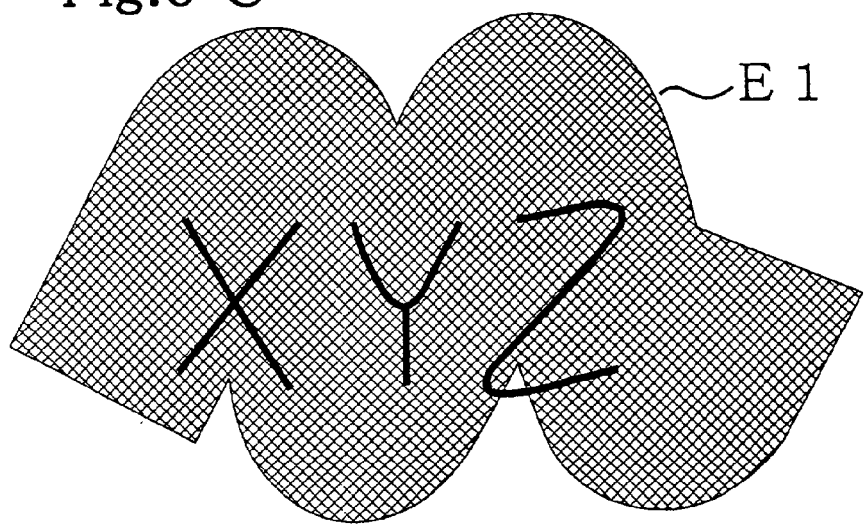
Figure 6:
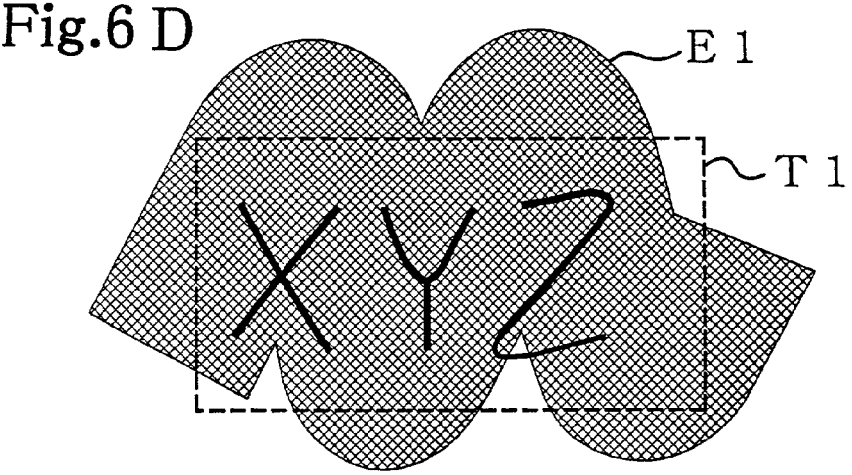
Figure 6:
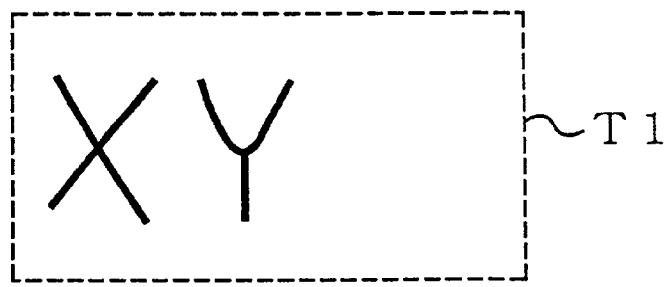
Figure 6:
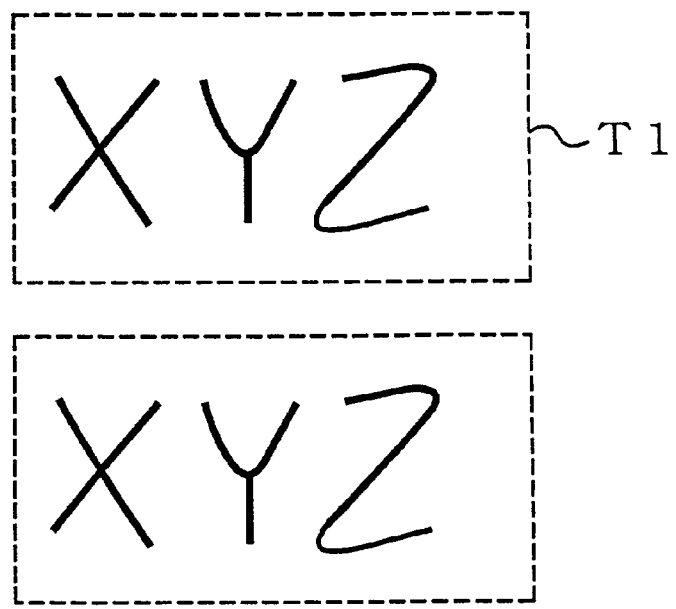

FIG. 6A is one example of strokes (a character train "ABC") written on the input plane 21A. FIG. 6B schematically shows an erasing stroke E1 of the eraser 40 when erasing the writing strokes of the character train "ABC". FIG. 6C is another example of strokes (a character train "XYZ") written over the erasing stroke E1 on the input plane 21A. FIG. 6D schematically shows an editing area T1 set for editing the character train "XYZ". FIG. 6E is one example of edited strokes by erasing the character "Z" from the character train "XYZ". FIG. 6F is another example of edited strokes by copying the character train "XYZ". For explanation purposes, it is assumed that the character train "ABC" is first written on the input plane 21A by the pen 60 and then erased by wiping the input plane 21A by the eraser 40 along the erasing stroke E1, and that the character train "XYZ" is written over the erasing stroke E1 and the corresponding stroke data is now to be edited. Namely, the writing stroke data of the character train "XYZ" is the target stroke data, and the writing stroke data of the character train "ABC" and the erasing data of the erasing stroke E1 are non-target stroke data.

In this example, the editing area T1 is set as a rectangular area in step S110, as shown in the dashed line in FIG. 6A, including the character train XYZ therein. The CPU 105 refers to one stroke data corresponding to one of the strokes located within the editing area T1 in step S112. Then, the CPU 105 determines, in step S114, whether the referred stroke data corresponds to any erasing stroke data. When the stroke data corresponds to the writing stroke data, the CPU 105 retrieves the referred stroke data, and the monitor 103 displays the stroke corresponding to the retrieved stroke data. In this example, only when the CPU 105 determines that the displayed stroke indicates the character train "XYZ" in step S116, the corresponding writing stroke data is selected in step S118. If the displayed stroke indicates the character train "ABC", the corresponding writing stroke data is not selected. Further, the CPU 105 does not select the referred stroke data, when the stroke data correspond to the erasing stroke data of the erasing stroke E1. The CPU 105 repeats steps S112 to 120 until judging that all the stroke data in the editing area T1 has been referred in the RAM 106 in step S120. By now, only the target writing stroke data, indicative of the character train "XYZ" has been selected in this example.

Then, the CPU 105 edits the stroke data in steps S122 to S132 according to a given instruction. For example, if the CPU 105 recognizes an instruction to copy the character train "XYZ" in step S126, the CPU 105 makes a copy of the character train "XYZ" in step S128, as shown in FIG. 6F. The top portion of FIG. 6F is the original character train "XYZ" and the bottom portion is the copy. If the CPU 105 recognizes an instruction to delete the character "Z" from the character train "XYZ in step S130, the CPU 105 deletes the character "Z" in step S132, as shown in FIG. 6E.

As described above, the stroke data editing device 100 of the first exemplary embodiment retrieves the writing stroke data, while withdrawing the erasing stroke data without time- and labor-consuming operations, even if the editing area is set including the writing strokes and the erasing stroke. Further, the stroke data editing device 100 retrieves the writing stroke data on a stroke basis, so that the target stroke data can be easily specified. Therefore, the stroke data editing device 100 of the first exemplary embodiment can easily select the target writing stroke data.

Figure 7:
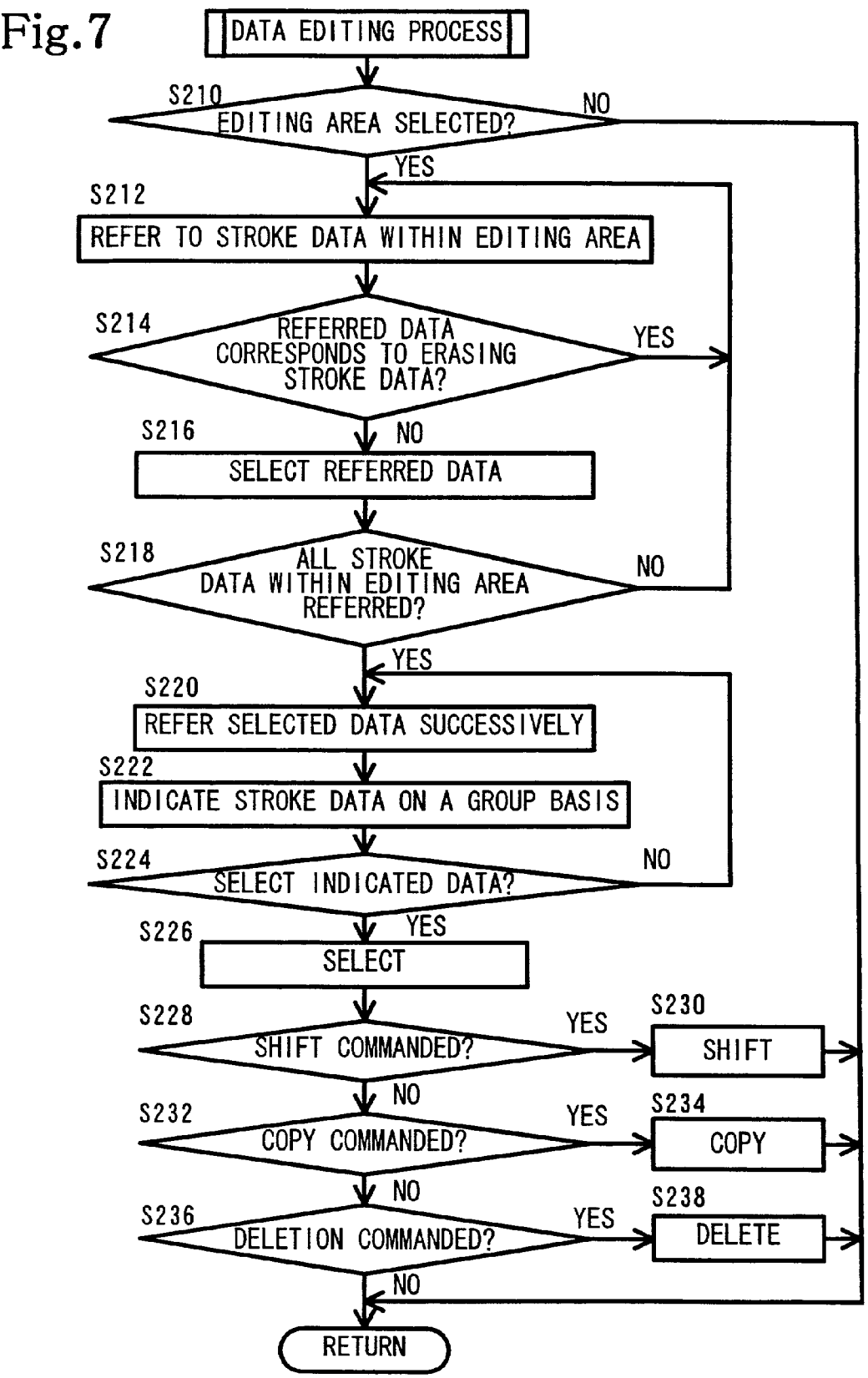
FIG. 7 is a flowchart for editing the stroke data according to a second exemplary embodiment of the invention.

Next, the stroke data editing process of step S5 will be explained below, according to a second exemplary embodiment of the invention. FIG. 7 is a flowchart for editing the stroke data according to the second exemplary embodiment of the invention. As to a further discussion of the stroke data editing process of the second exemplary embodiment, the same should be apparent from the above description. Accordingly, the further discussion will be focused on differences between the first and the second exemplary embodiments, whereby like parts and components are designated by the same reference numerals, thereby avoiding duplicating the descriptions.

When the CPU 105 judges that the editing area has been set in step S210, the CPU 105 refers to the stroke data within the set editing area in step 212 and determines whether the referred stroke data is erasing stroke data in step S214. If No in step S214, the referred stroke data is selected in step S216. If Yes in step S214, the CPU 105 returns to step S212, and refers to other stroke data. The CPU 105 repeats the steps S212 to S218 until judging, in step S218, that all the stroke data within the editing area has been referred.

Then, the CPU 105 withdraws non-target writing stroke data and extracts and selects target writing stroke data as described below.

In step S220, the CPU 105 refers to the selected writing stroke data successively, at the same time, checks the storage time data T in each of the items of the selected writing stroke data. In this exemplary embodiment, the selected writing stroke data is referred in reverse chronological order. Herein, it is defined that the stroke data SDn referred in the nth place includes the storage time data Tn indicative of the storage time tn, n being an integer of 1 or more. Then, the CPU 105 determines whether there is more than a predetermined reference time lag between the storage times tn and tn+1 based on the storage time data Tn and Tn+1. When there is less than the reference time lag between the storage times tn and tn+1, the CPU 105 determines that the stroke data SDn and SDn+1 belong to a same stroke group. On the other hand, when there is more than the reference time lag between the storage times tn and tn+1, the CPU 105 determines that the stroke data SDn and SDn+1 belong to different stroke groups, so that the stroke data SDn belongs to a newer group than the stroke data SDn+1.

In this exemplary embodiment, if there exist any erasing stroke data between the writing stroke data SDn and SDn+1, the CPU 105 determines that the stroke data SDn and SDn+1 belong to different stroke groups, regardless of whether there is more than the reference time lag between the storage times tn and tn+1. Also, if the stroke data SDn and SDn+1 has different kinds of color data, width data or ID data, the CPU 105 determines that the stroke data SDn and SDn+1 belong to different stroke groups, regardless of whether there is more than the reference time lag between the storage times tn and tn+1.

In step S222, when the CPU 105 specifies the stroke data belonging to one stroke group, the corresponding one or more writing strokes are indicated (for example, being flashed) on the monitor 103. The CPU 105 checks for, in step S224, a judgement as to whether the indicated strokes correspond to the target strokes. The judgement is generally made by the operator, while checking the indicated strokes on the monitor 103. If the indicated strokes correspond to the non-target strokes (namely, No in step S224), the CPU 105 returns to step S220 and refers to next stroke data. If the indicated strokes correspond to the target strokes (Yes in step S224), the CPU 105 selects the corresponding stroke data as the target stroke data in step S226.

Finally, in steps S228 to S238, the CPU 105 edits only the target writing stroke data according to given instructions.

Figure 8:
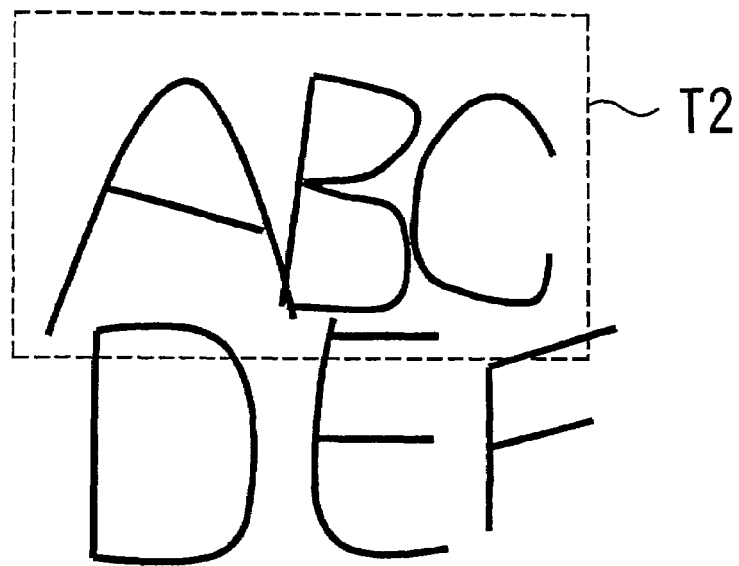
FIGS. 8A to 8C schematically show how the editing processes proceed according to the second exemplary embodiment of the invention.
Figure 8:
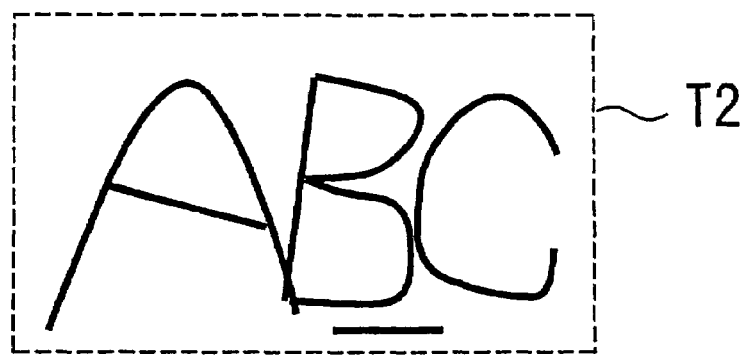
Figure 8:
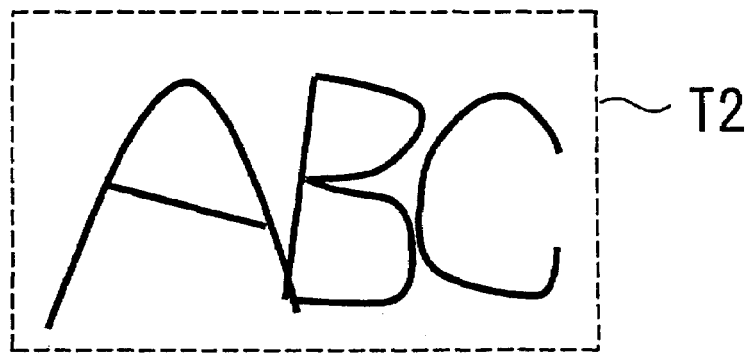

Now, FIG. 8A is one example of strokes (character trains "ABC" and "DEF") written in two lines on the input plane 21A. For explanation purposes, it is now assumed that the character trains "ABC" and "DEF" are written in alphabetical order, and that there is more than the predetermined reference time lag between writing the character trains "ABC" and "DEF", but shorter time difference than the reference time lag between writing the strokes of the characters "A", "B" and "C". It is also assumed that only the stroke data of the character train "ABC" is to be edited, but the editing area T2 is set including not only the character train "ABC" but also the heads of the characters "D", "E" and "F" as shown in 8B.

In this example, the CPU 105 identifies, in step S210, the strokes of the character train "ABC" and one horizontal line at the head of the character "E" as being included in the editing area T2. Then, the erasing stroke data is withdrawn by performing steps S212 to S218, if any.

In step S220, the CPU 105 refers to the writing stroke data selected in step S216 in reverse chronological order. More specifically, the CPU 105 identifies the stroke data of the horizontal line of the character "E" as the latest stroke data. Then, the CPU 105 compares the storage time data between the character train "ABC" and the horizontal line of the character "E". Upon the above-mentioned assumption, the CPU 105 determines that the stroke data of the character train "ABC" belongs to a precedent stroke group and the stroke data of the horizontal line of the character "E" belongs to a new stroke group. As a result, the horizontal line of the character "E" is first indicated, being flashed, in step S222.

The CPU 105 determines, in step S224, that the horizontal line of the character "E" is not the target writing stroke in accordance with the operator's judgement, and does not select the stroke data of the horizontal line of the character "E" in step S226. Back to steps S220 and S222, the character train "ABC" is next referred and indicated. The CPU 105 determines that the character train "ABC" is the target strokes in step S224, and selects the stroke data of the character train "ABC" as target stroke data in step S226. Only the target strokes (the character train "ABC") have been selected within the editing area T2, as shown in FIG. 8C, through steps S220 to S226.

Finally, the CPU 105 may makes a shift, a copy or a deletion of the whole or some of the target strokes in steps S228 to S238 according to the operator's instruction.

As described above, the stroke data editing device 100 of the second exemplary embodiment indicates the writing strokes on a group basis so that it is easily determined whether the indicated strokes are target strokes. Therefore, the stroke data editing device 100 of the second exemplary embodiment can easily extract and select the target writing strokes without time- and labor-consuming operations.

Figure 9:
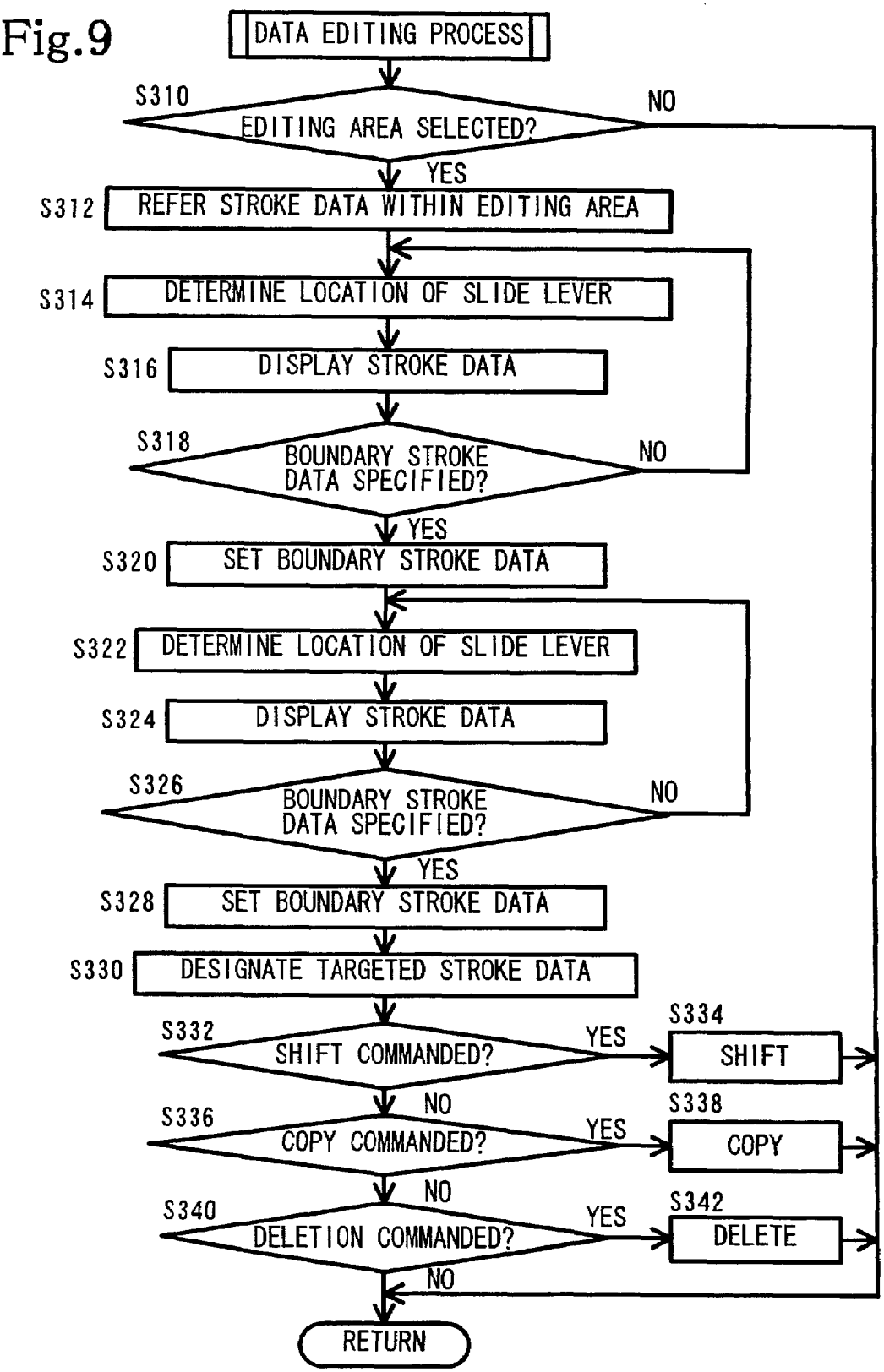
FIG. 9 is a flowchart for editing the stroke data according to a third exemplary embodiment of the invention.

The stroke data editing process of step S5 will be explained below, according to a third exemplary embodiment of the invention. FIG. 9 is a flowchart for editing the stroke data according to the third exemplary embodiment of the invention. As to a further discussion of the stroke data editing process of the third exemplary embodiment, the same should be apparent from the above description. Accordingly, the further discussion will be focused on differences between the first and the third exemplary embodiments, whereby like parts and components are designated by the same reference numerals, thereby avoiding duplicating the descriptions.

In this exemplary embodiment, the monitor 103 also displays a slide lever R1 and calibration markings as shown in FIG. 10A. The slide lever R1 is movable in a horizontal direction (in both of a right-to-left and a left-to-right directions) along the calibration markings. The slide lever R1 is moved by dragging a pointer of the mouse 104 on the monitor 103.

The location of the slide lever R1 along the calibration markings corresponds to some point in the process of writing and erasing one or more strokes on the input plane 21A and storing the corresponding stroke data into the RAM 106.

When the slide lever R1 is at the leftmost calibration marking, as shown in FIG. 10A, the monitor 103 indicates an initial screen with no strokes. When moving the slide lever R1 toward the right, screen displays are produced on the monitor 103, indicating the strokes written on the input plane 21A at the time corresponding to the location of the slide lever R1.

For example, it is assumed that a character train "ABC" is first written on the input plane 21A and erased by an erasing stroke E2, and then, a character train "XYZ" is written over the erasing stroke E2. In this case, when moving the slide lever R1 toward the right along the calibration markings, the character train "ABC" is displayed stroke by stroke on the monitor 103 as shown in FIG. 10B. Then, the character train "XYZ" is displayed stroke by stroke on the monitor 103 as shown in FIGS. 10C and 10D, when moving the slide lever R1 toward the right along the calibration markings.

When the CPU 105 judges that the editing area has been set in step S310, the CPU 105 refers to the stroke data in the set editing area in step S312.

Then, the CPU 105 further judges whether the slide lever R1 has been moved along the calibration markings according to an operator's operation and determines a location of the slide lever R1 in step S314. In step S316, one or more writing strokes are displayed on the monitor 103 in response to the location of the slide lever R1 determined in step S314. In step S318, the CPU 105 judges whether any of the one or more writing strokes, displayed on the monitor 103 in step S316, is specified as a boundary writing stroke according to an operator's operation. If Yes in step S318, the CPU 105 sets the stroke data corresponding to the specified stroke as boundary stroke data in step S320. In step S322, the CPU 105 judges whether the slide lever R1 has been further moved along the calibration markings, and determines a location of the slide lever R1. In step S324, one or more strokes are displayed on the monitor 103 in response to the location of the slide lever R1 determined in step S322. In step S326, the CPU 105 judges whether any of the one or more writing strokes, displayed on the monitor 103 in step S324, is specified as another boundary writing stroke according to operator's instruction. If Yes in step S326, the CPU 105 sets the stroke data corresponding to the specified stroke as boundary stroke data in step S328. In step S330, the CPU 105 designates writing stroke data as target stroke data, so that every storage time of the designated writing stroke data falls between the storage times of the boundary stroke data inclusive.

Finally, the CPU 105 edits the designated target writing stroke data according to an operator's instruction in steps S332 to S342.

It should be noted that steps S322 and S324 are not necessarily performed, if the boundary writing strokes are displayed at one time on one screen of the monitor 103 in step 316. In such a case, step S326 is performed just after step S320, while steps S322 and S324 are skipped. In addition, the boundary strokes may be the same, so that only one target writing stroke is to be edited.

As described above, the stroke data editing device 100 of the third exemplary embodiment retrieves and develops the display of the stroke data stroke by stroke in chronological order or reverse chronological order with simple operations, such as dragging the slide lever R1 along the calibration markings. Moreover, the target stroke data is defined by only specifying the boundary stroke data. Therefore, the stroke data editing device 100 of the third exemplary embodiment can easily extract and select the target stroke data.

Figure 11:
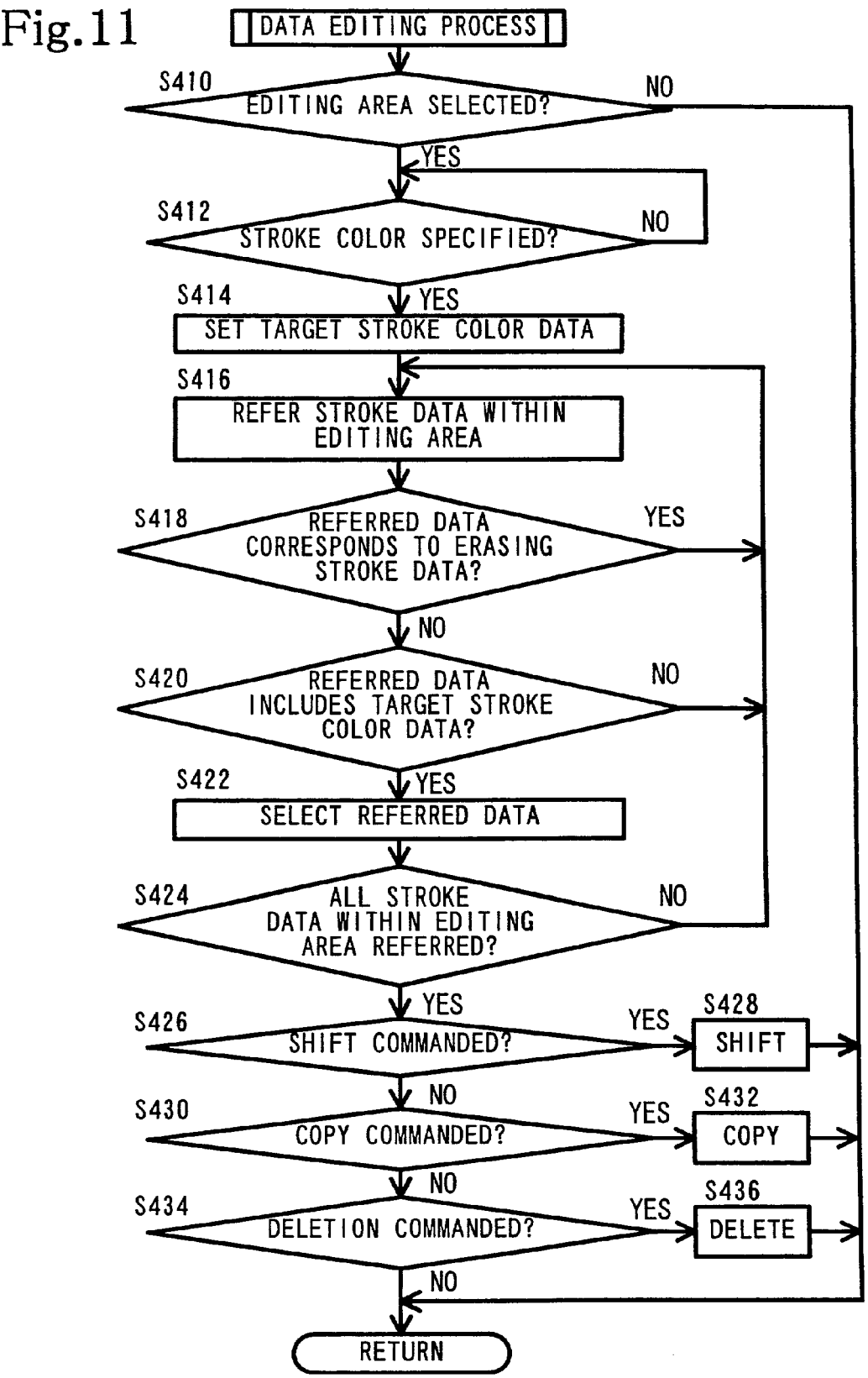
FIG. 11 is a flowchart for editing the stroke data according to a fourth exemplary embodiment of the invention.

According to a fourth exemplary embodiment of the invention, the stroke data editing process of step S5 will be explained in detail with reference to FIG. 11. FIG. 11 is a flowchart for editing the stroke data according to the fourth exemplary embodiment of the invention. As to a further discussion of the stroke data editing process of the fourth exemplary embodiment, the same should be apparent from the above description. Accordingly, the further discussion will be focused on differences between the first and the fourth exemplary embodiments, wherein like parts and components are designated by the same reference numerals, thereby avoiding duplicating the descriptions.

The stroke data editing device 100 of the fourth exemplary embodiment is characterized as editing the stroke data corresponding to the stroke of a specific stroke color. More specifically, the stroke data editing device 100 of the fourth exemplary embodiment has a function of extracting the stroke data that includes the color data of the specific stroke color. The specific stroke color can be designated by the operator on the monitor 103. Further, one or more specific stroke colors may be designated.

After judging that the editing area has been set in step S410, the CPU 105 determines whether any stroke color has been specified in step S412. If Yes in step S412, the CPU 105 sets the color data of the specified stroke color to target stroke color data in step S414. Then, the CPU 105 refers to the stroke data in the set editing area in step S416, and determines whether the referred stroke data is the erasing stroke data based on the ID data in step S418. If No in step S418, the CPU 105 further determines whether the referred stroke data includes the target stroke color data in step S420. If Yes in step S420, the CPU 105 selects the referred stroke data as the target writing stroke data in step S422. If No in step S420, the CPU 105 moves back to step S416 without selecting the referred stroke data, and refers to the next stroke data in the editing area.

When judging, in step S424, that all the stroke data has been referred and subjected to steps S416 to S420, the CPU 105 edits the selected writing stroke data according to an operator's instruction in steps S426 to S436.

For example, it is assumed that there are written strokes in red and black, and that it is intended to edit the black-colored strokes. In this case, the black stroke color is specified as the target stroke color in step S414. The CPU 105 selects the stroke data including the target stoke color data (namely, the color data of black), and does not select the stroke data including the color data of red over steps S416 to S424. Thus, the stroke data editing device 100 can edit only the stroke data of the black stroke color, with its simple operations, according to this exemplary embodiment.

In the above-mentioned exemplary embodiment, the color data is used for extracting the target stroke data. Alternatively, one of the stroke color, the stroke width and the pen ID can be used for extracting the target stroke data.

Figure 12A:
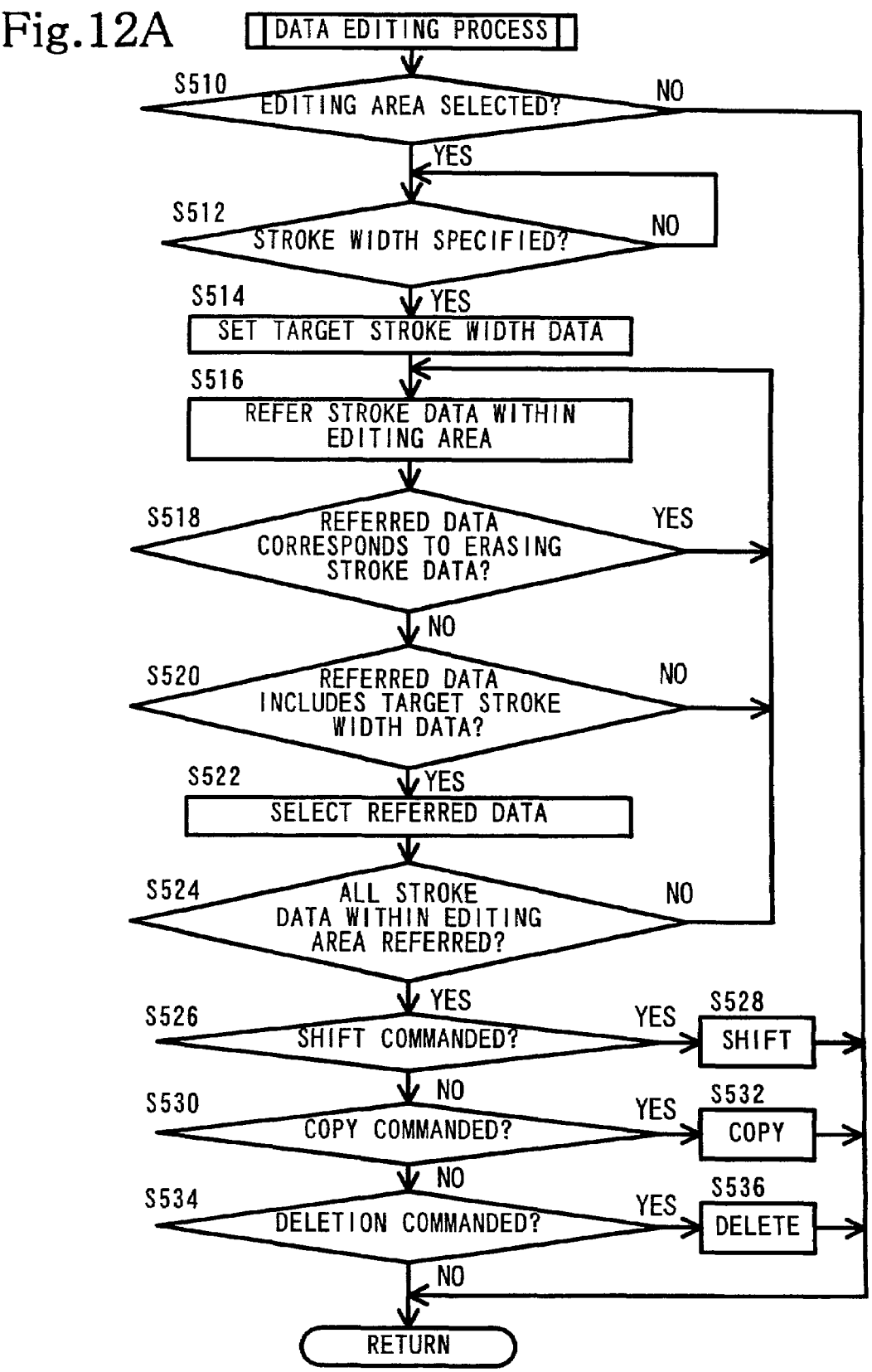
FIG. 12A is a flowchart for editing the stroke data according to a modification of the fourth exemplary embodiment of the invention.

FIG. 12A is a flowchart for editing the stroke data according to one modification of the fourth exemplary embodiment. The stroke data editing device 100 of the modified embodiment has a function of selecting the stroke data that includes specific width data.

When judging that an editing area has been specified in step S510 and that there has been designated a specific stroke width in step S512, the CPU 105 sets the width data of the specific stroke width to target stroke width data in step S514. More than one stroke width could be designated as the target stroke widths. While referring to the stroke data in the set editing area in step S516, the CPU 105 determines whether the referred stroke data is erasing stroke data in step S518. If No in step S518, the CPU 105 further determines whether the referred stroke data includes the target stroke width data in step S520. If Yes in step S520, the CPU 105 selects the referred data in step S522, and goes to step S524. If No in step S520, the CPU 105 moves back to step S516, without selecting the referred stroke data, and refers other stroke data. After ensuring, in step S524, that all the stroke data has been referred and the target stroke data has been selected, the CPU 105 edits the selected stroke data according to an operator's instruction in steps S526 to S536.

If there are written strokes in thick stroke width and thin stroke width and it is intended to edit only the strokes written in the thick stroke width, the thick stroke width is designated and set to the target stroke width in step S514. Then, in step S520, the CPU 105 selects the stroke data including the target stroke width data (namely, the width data indicative of the thick stroke width), but does not select the stroke data including the width data indicative of the thin stroke width.

Figure 12B:
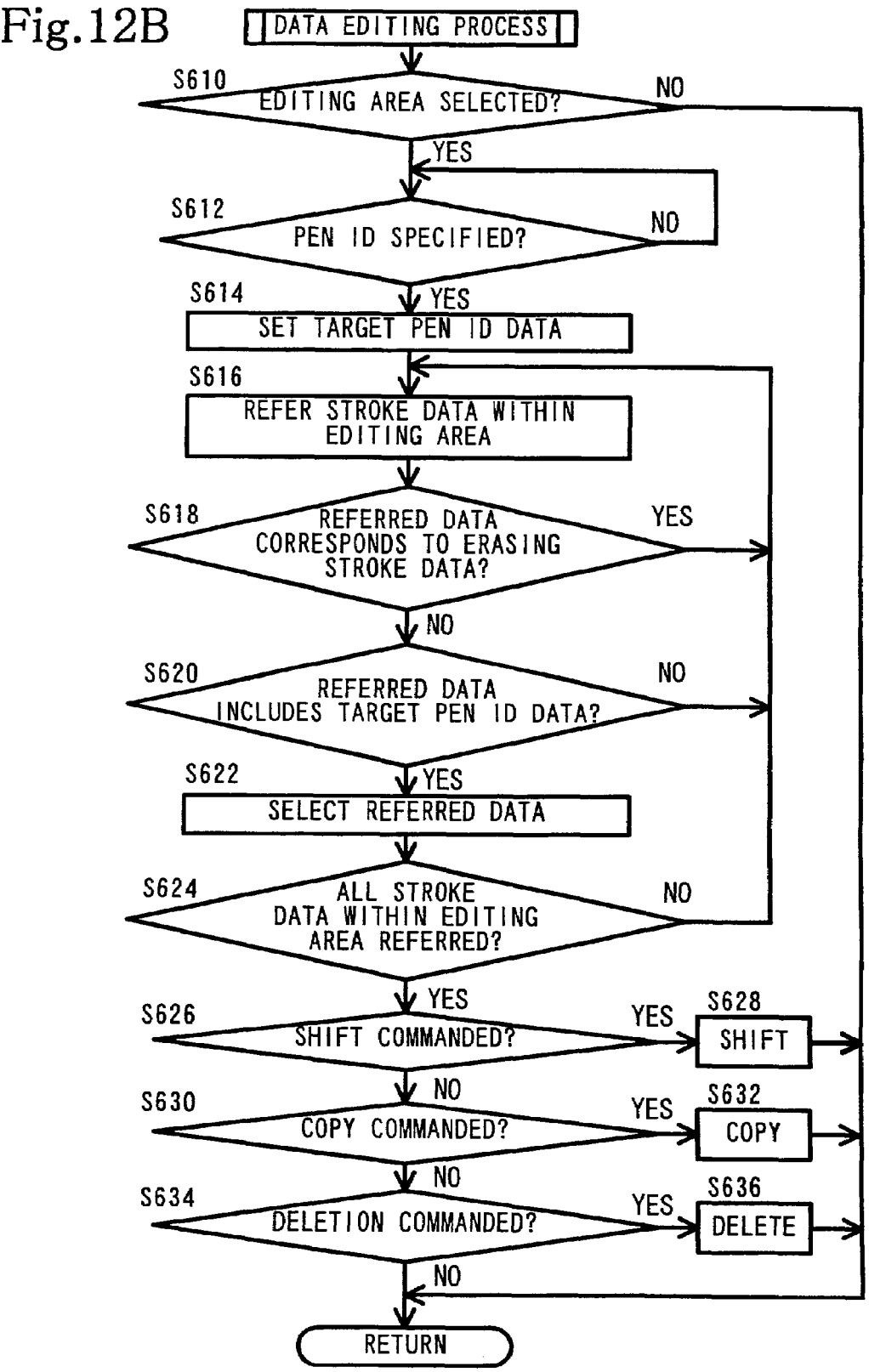
FIG. 12B is a flowchart for editing the stroke data according to another modification of the fourth exemplary embodiment of the invention.
Figure 13:
FIGS. 13A to 13E schematically show how editing processes proceed according to the related art.
Figure 13:
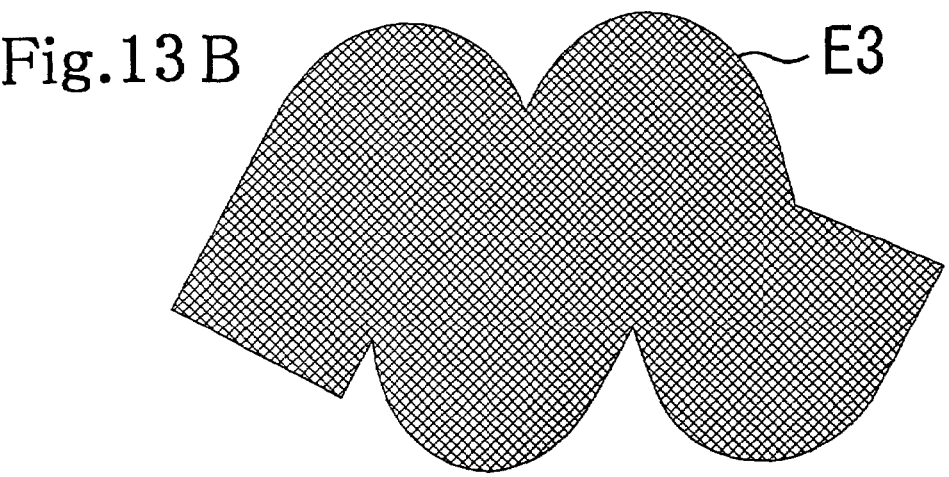
Figure 13:
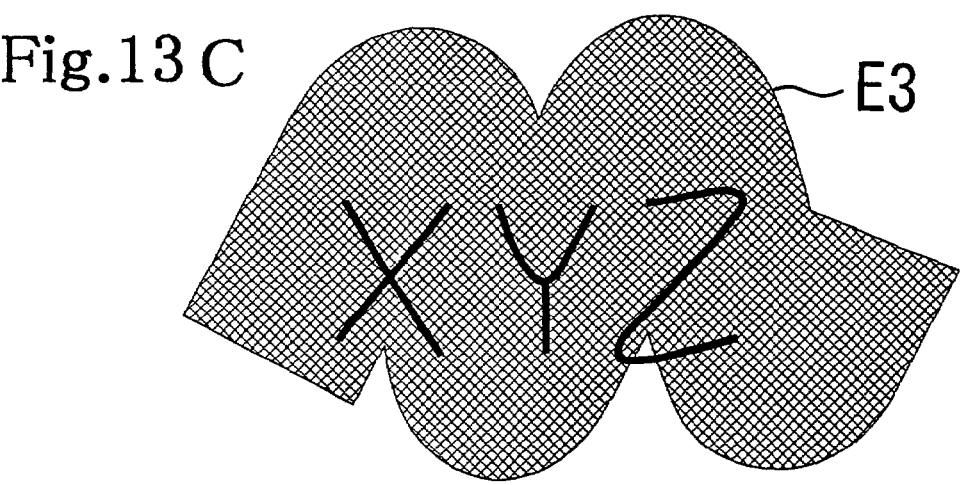
Figure 13:
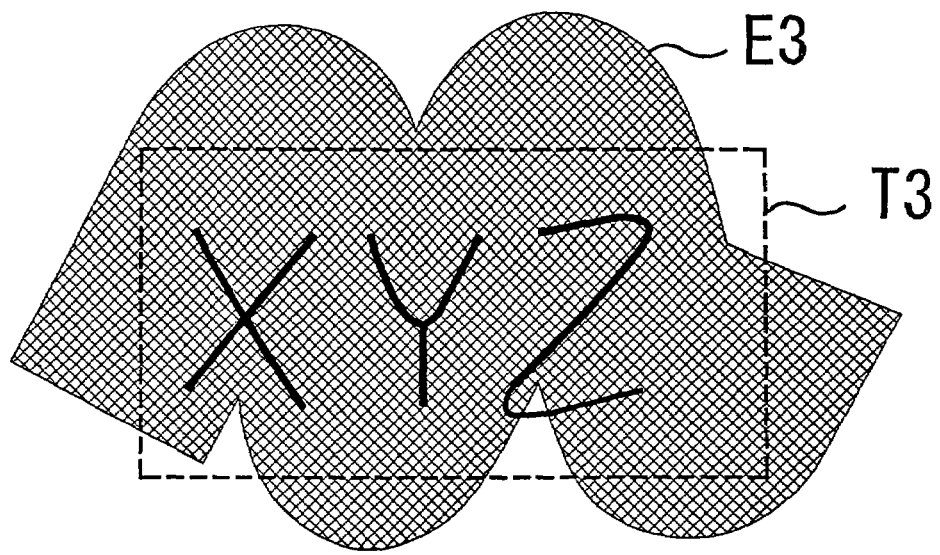
Figure 13:
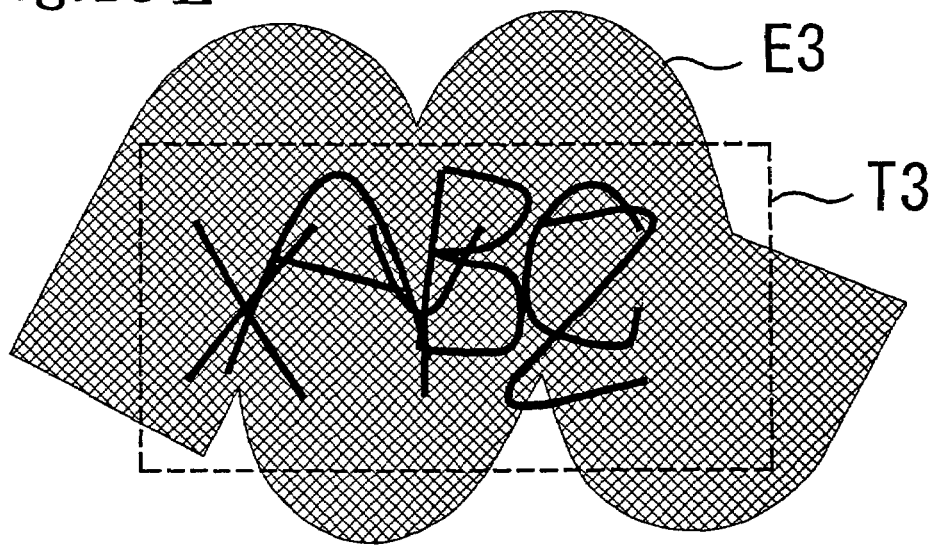
Figure 14:
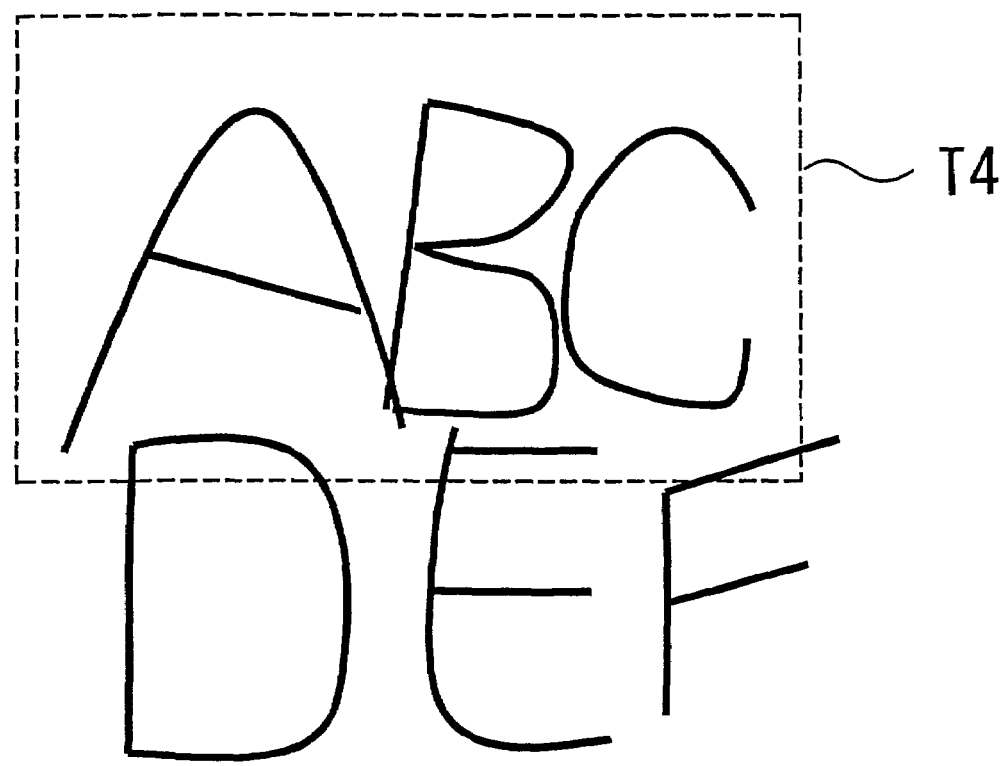
FIG. 14 schematically shows an editing process according to the related art.

FIG. 12B is a flowchart for editing the stroke data according to another modification of the fourth exemplary embodiment. The stroke data editing device 100 of this modified exemplary embodiment has a function of extracting the stroke data that includes specific pen ID data.

As is the same as above, the CPU 105 judges that an editing area has been specified in step S610 and that there has been designated a specific pen ID in step S612. Then, the CPU 105 sets the ID data of the specific pen ID to target pen ID in step S614. More than one pen ID may be set to the target pen ID. While referring to the stroke data in the set editing area in step S616, the CPU 105 determines whether the referred stroke data is erasing stroke data in step S618. If No in step S618, the CPU 105 further determines whether the referred stroke data includes the target pen ID data in step S620. If Yes in step S620, the CPU 105 selects the referred data in step S622, and goes to step S624. If No in step S620, the CPU 105 moves back to step S612, without selecting the referred stroke data, and refers other stroke data. After ensuring, in step S624, that all the stroke data has been referred and the target stroke data has been selected, the CPU 105 edits the selected stroke data according to an operator's instruction in steps S626 to S636.

It is now assumed that there are a plurality of operators that have their respective pens 60 and that they write their strokes on a single input plane 21A. If it is intended to extract one or more strokes written by one operator, the pen ID allocated to the one operator is designated and set to the target pen ID in step S614. Then, the CPU 105 selects the stroke data including the target stroke width data (namely, the pen ID of the one operator) in step S622.

As described above, the stroke data editing device 100 of the fourth exemplary embodiment selects the stroke data including the target stroke color data, target stroke width data or target ID data. Therefore, the stroke data editing device 100 of the fourth exemplary embodiment can easily select target stroke data based on the color data, the width data, and the ID data without the user checking the respective stroke data.

Although one of the stroke color, the stroke width and the pen ID is used for selecting and extracting the target stroke data in the above-mentioned exemplary embodiments, a combination of the stroke color, the stroke width and/or the pen ID may be used for removing the unnecessary non-target stroke data.

Further, the target stroke color data, the target stroke width data and the targeted pen ID data are set, respectively, in steps S412, S512 and S612 of the above-mentioned exemplary embodiments. It is alternatively possible to set the designated stroke color, stroke width and pen ID as a non-target stroke color, a non-target stroke width and a non-target pen ID, so as to withdraw the stokes of the non-target stroke color, width and pen ID from editing. In these cases, the CPU 105 selects the referred data in steps S422, S522 and S622, if No in steps S420, S520 and S620, respectively.

In addition to the above-mentioned exemplary embodiments, the pen 60 may further comprise a function of modulating and transmitting pen pressure data, which indicates a pen pressure applied against the input plane 21A for writing, and the electric whiteboard 1 may further have a function of receiving and demodulating the pen pressure data. In such a case, the stroke data editing device 100 is configured to receive the pen pressure data, so as to select the target stroke data based on the pen pressure data. For example, the stroke data editing device 100 can retrieve and select the stroke data of which the pen pressure falls within a determined pressure area.

According to a further exemplary embodiment of the invention, the stroke data editing device 100 is configured to retrieve and select the stroke data of which the storage time does not fall within a designated time period.

Although the invention has been described referring to the exemplary embodiments, the invention is not limited to the above exemplary embodiments, and those skilled in the art will easily conceive that various improvements and modifications can be made without deviating from the scope of the invention.

Needless to say, it is possible to provide the stroke data editing device 100 that performs the stroke data editing process according to a combination of more than one of the above-described embodiments of the invention.

What is claimed is:

1. A stroke data editing device, for editing stroke data, indicating at least one stroke of a coordinate input device, comprising:
    a stroke data storage unit that stores stroke data, each piece of the stroke data corresponding to one stroke of the coordinate input device;
    a stroke data retrieving unit that selectively retrieves at least one piece of the stroke data stored within the stroke data storage unit according to a predetermined condition, the retrieved stroke data corresponding to at least one stroke included in a predetermined area; and
    a stroke data editing unit that edits at least one piece of the stroke data retrieved by the stroke data retrieving unit on a stroke basis, wherein:
    each piece of the stroke data includes at least one of storage time data indicating a storage time of storing the stroke data into the stroke data storage unit, color data indicating a color of the stroke, width data indicating a width of the stroke, and identification data indicating an identification of the coordinate input device,
    the predetermined condition is determined based on at least one of the storage time data and the identification data,
    when the predetermined condition is determined based on the storage time data, the stroke data stored in the stroke data storage unit is read successively, and a presently-read stroke data is selected when there is less than a predetermined time difference between the storage times of the presently-read stroke data and a precedently-read stroke data, and
    when the predetermined condition is determined based on the identification data, each piece of the stroke data includes one of a first identification data corresponding to a first stroke type and a second identification data corresponding to a second stroke type, the first stroke type giving visual information, the second stroke type visually dismissing the first stroke, and the predetermined condition is that the retrieved stroke data is free from the second identification data.

2. The stroke data editing device as claimed in claim 1, further comprising a first selection unit that selects the at least one piece of the stored stroke data to be retrieved by the stroke data retrieving unit according to the predetermined condition.

3. The stroke data editing device as claimed in claim 2, further comprising a second selection unit that selects the at least one piece of the retrieved stroke data to be edited by the stroke data editing unit.

4. The stroke data editing device as claimed in claim 2, further comprising a display unit that makes a display of at least one stroke indicated by the stroke data stored in the stroke data storage unit.

5. The stroke data editing device as claimed in claim 4, further comprising an area setting unit that sets the predetermined area, including the at least one stroke, corresponding to the stroke data retrieved by the stroke data retrieving unit.

6. The stroke data editing device as claimed in claim 5, wherein the area setting unit sets the predetermined, area, so that the predetermined area includes at least a part of the display made by the display unit.

7. The stroke data editing device as claimed in claim 5, wherein the area setting unit sets the predetermined area, so that the predetermined area corresponds to at least a part of a locatable area on which the coordinate input device is locatable to give the stroke.

8. The stroke data editing device as claimed in claim 2, wherein when the predetermined condition is determined based on the storage time data, the first selection unit specifies a first boundary stroke data and a second boundary stroke data among the stroke data stored in the stroke data storage unit, and selects the stroke data so that every storage time of the selected stroke data inclusively falls between the storage times of the first and the second boundary stroke data.

9. The stroke data editing device as claimed in claim 1, wherein the stroke data storage unit stores the stroke data on time series based on the storage time data, and the stroke data retrieving unit retrieves the stroke data on time series based on the storage time data.

10. The stroke data editing device as claimed in claim 1, wherein the predetermined condition is also determined based on the color data.

11. The stroke data editing device as claimed in claim 1, wherein the predetermined condition is also determined based on the width data.

12. A stroke data editing device, for editing stroke data, indicating at least one stroke of an coordinate input device, comprising:
   storing means for storing stroke data therein, each piece of the stroke data corresponding to one stroke of the coordinate input device;
   retrieving means for selectively retrieving at least one piece of the stored stroke data from the storing means according to a predetermined condition, the retrieved stroke data corresponding to at least one stroke included in a predetermined area; and
   editing means for editing at least one piece of the retrieved stroke data on a stroke basis, wherein:
      each piece of the stroke data includes at least one of storage time data indicating a storage time of storing the stroke data into the storing means, color data indicating a color of the stroke, width data indicating a width of the stroke, and identification data indicating an identification of the coordinate input device,
      the predetermined condition is determined based on at least one of the storage time data and the identification data,
      when the predetermined condition is determined based on the storage time data, the stroke data stored in the storing means is read successively, and a presently-read stroke data is selected when there is less than a predetermined time difference between the storage times of the presently-read stroke data and a precedently-read stroke data, and
      when the predetermined condition is determined based on the identification data, each piece of the stroke data includes one of a first identification data corresponding to a first stroke type and a second identification data corresponding to a second stroke type, the first stroke type giving visual information, the second stroke type visually dismissing the first stroke, and the predetermined condition is that the retrieved stroke data is free from the second identification data.

13. The stroke data editing device as claimed in claim 12, further comprising:
   selecting means for selecting the at least one piece of the stored stroke data retrieved according to the predetermined condition.

14. A method for editing stroke data, indicating at least one stroke, of an coordinate input device, comprising:
   storing stroke data in a memory, each piece of the stroke data corresponding to one stroke of the coordinate input device;
   retrieving selectively at least one piece of the stored stroke data from the memory according to a predetermined condition, the retrieved stroke data corresponding to at least one stroke included in a predetermined area; and
   editing at least one piece of the retrieved stroke data on a stroke basis, wherein:
      each piece of the stroke data includes at least one of storage time data indicating a storage time of storing the stroke data into the memory, color data indicating a color of the stroke, width data indicating a width of the stroke, and identification data indicating an identification of the coordinate input device,
      the predetermined condition is determined based on at least one of the storage time data and the identification data,
      when the predetermined condition is determined based on the storage time data, the stroke data stored in the memory is read successively, and a presently-read stroke data is selected when there is less than a predetermined time difference between the storage times of the presently-read stroke data and a precedently-read stroke data, and
      when the predetermined condition is determined based on the identification data, each piece of the stroke data includes one of a first identification data corresponding to a first stroke type and a second identification data corresponding to a second stroke type, the first stroke type giving visual information, the second stroke type visually dismissing the first stroke, and the predetermined condition is that the retrieved stroke data is free from the second identification data.

15. The method as claimed in claim 14, further comprising:
   selecting the at least one piece of the stored stroke data retrieved according to the predetermined condition.

16. A computer-readable memory medium for editing stroke data indicating at least one stroke of a coordinate input device, the memory medium storing a program comprising:

instructions to store stroke data in a memory, each piece of the stroke data corresponding to one stroke of the coordinate input device;

instructions to selectively retrieve at least one piece of the stroke data from the memory according to a predetermined condition, the retrieved stroke data corresponding to at least one stroke included in a predetermined area; and instructions to edit at least one piece of the retrieved stroke data on a stroke basis, wherein:

each piece of the stroke data includes at least one of storage time data indicating a storage time of storing the stroke data into the memory, color data indicating a color of the stroke, width data indicating a width of the stroke, and identification data indicating an identification of the coordinate input device, the predetermined condition is determined based on at least one of the storage time data and the identification data, when the predetermined condition is determined based on the storage time data, the stroke data stored in the memory is read successively, and a presently-read stroke data is selected when there is less than a predetermined time difference between the storage times of the presently-read stroke data and a precedently-read stroke data, and when the predetermined condition is determined based on the identification data, each piece of the stroke data includes one of a first identification data corresponding to a first stroke type and a second identification data corresponding to a second stroke type, the first stroke type giving visual information, the second stroke type visually dismissing the first stroke, and the predetermined condition is that the retrieved stroke data is free from the second identification data.

17. The computer-readable memory medium as claimed in claim 16, the program further comprising:

instructions to select the at least one piece of the stored stroke data retrieved according to the predetermined condition.

\* \* \* \* \*